United States Patent [19]

McVicar

[11] Patent Number: 5,895,905
[45] Date of Patent: Apr. 20, 1999

[54] SCANNER WITH AN INTERNAL MOTOR AND A CONTACT IMAGE SENSOR

[75] Inventor: David McVicar, Eldorado, Calif.

[73] Assignee: Logitech, Inc., Fremont, Calif.

[21] Appl. No.: 08/806,890

[22] Filed: Feb. 25, 1997

[51] Int. Cl.⁶ .................................................. G06K 7/10
[52] U.S. Cl. .......................... 235/454; 358/491; 250/234
[58] Field of Search .............................. 358/490, 491, 358/474; 250/208.1, 234; 355/75, 47, 104; 310/67 R, 83; 235/454

[56] References Cited

U.S. PATENT DOCUMENTS

| 3,875,587 | 4/1975 | Pugsley | 350/286 |
|---|---|---|---|
| 3,938,191 | 2/1976 | Jarmy | 358/491 |
| 4,131,916 | 12/1978 | Landsman | 358/285 |
| 4,622,591 | 11/1986 | Katsuyama et al. | 358/290 |
| 4,692,813 | 9/1987 | Conrad et al. | 358/491 |
| 4,827,129 | 5/1989 | Tressl et al. | 358/491 |
| 5,026,133 | 6/1991 | Roddy et al. | 358/491 |
| 5,526,142 | 6/1996 | Ouellette | 358/491 |
| 5,550,416 | 8/1996 | Fanchang et al. | 310/83 |

Primary Examiner—Anita Pellman Gross
Assistant Examiner—Diane I. Lee
Attorney, Agent, or Firm—Townsend and Townsend and Crew LLP

[57] ABSTRACT

The present invention provides an improved image scanner which has a hollow platen, with a motor mounted inside the platen. A drive mechanism is coupled between the motor and the inside surface of the platen to rotate the platen. Preferably, a circuit board containing circuitry for at least controlling the motor is also mounted inside the platen.

6 Claims, 3 Drawing Sheets

SCANNER WITH AN INTERNAL MOTOR AND A CONTACT IMAGE SENSOR

BACKGROUND OF THE INVENTION

The present invention relates to image scanners and in particular to platens and motors used in such image scanners.

In an image scanner, a platen is typically used to feed the paper into the scanner. For a desktop unit, the platen rolls the paper into the scanner past an image sensor. The paper may be wedged between two platens, a platen and a pair of rollers, or a platen and a contract image sensor's glass face.

For hand-held scanners, a platen and rollers are used to move the scanner across the top of the paper to be scanned. Typically, only desktop scanners have a motor and the motor is attached to the end of the platen, with control circuitry for the motor then being mounted elsewhere in the housing and connected to the motor.

It is desirable to make a scanner which is more compact and lightweight, which can fit within a smaller form factor.

SUMMARY OF THE INVENTION

The present invention provides an improved image scanner which has a hollow platen, with a motor mounted inside the platen. A drive mechanism is coupled between the motor and the inside surface of the platen to rotate the platen. Preferably, a circuit board containing circuitry for at least controlling the motor is also mounted inside the platen.

In one embodiment, two end plates are connected to the platen. The first end plate supports the drive mechanism, which is preferably a set of gears which engage with annular gears on the inside surface of the end of the platen. The second end plate preferably engages small, idler gears which engage an annular gear on the other end of the platen. These gears are not connected in the drive mechanism but are used to provide a support mechanism for the platen through the end plate. Preferably, there is an opening in the second end plate to allow cabling to connect to the circuitry on the circuit board inside the platen.

Because the motor is placed inside the platen, this will allow the platen to be a larger diameter without increasing the size of the scanner, hence room outside the platen is saved. A larger diameter platen improves the paper handling capability, because more of the surface of the paper is contacted by, and gripped by, a larger diameter platen. It also allows more room for the motor to be inserted inside.

For a fuller understanding of the nature and advantages of the invention, reference should be made to the following description in conjunction with the accompanying drawings.

DESCRIPTION OF THE PREFERRED EMBODIMENT

Figure 1:
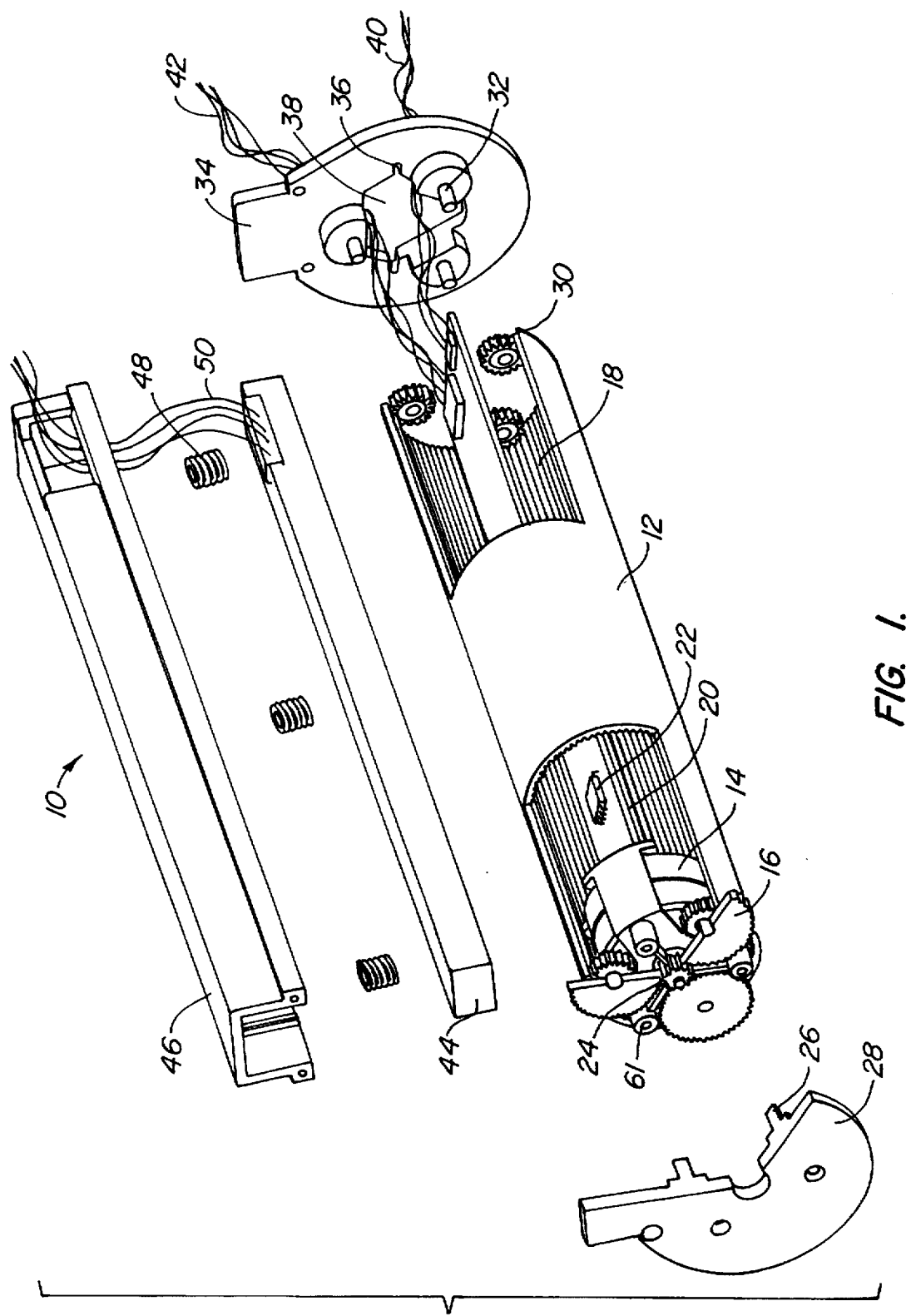
FIG. 1 is a partially exploded, partially cut-away, perspective view of a platen with an internal motor according to the present invention.

FIG. 1 illustrates a scanner 10 according to one embodiment of the present invention. A platen 12 has an internal motor 14. The motor is coupled to a set of gears 16, which engage with an annular gear 18 on the inside end surface of platen 12. A circuit board 20 includes circuitry 22 for controlling motor 14. The gears 16 are three gears in the embodiment shown which engage with a pinion gear 24 on motor 14. Each of gears 16 is supported by axles 26 extending from an end plate 28. The motor 14 is aligned and supported by the motor bracket 61 which also retains the gears in place. The motor bracket 61 is attached to the end plate 28, while the platen is allowed to rotate freely around the motor when driven by the gears. In an alternate embodiment, the motor bracket could be eliminated, with the motor being supported by the gears which would be supported by the end plate.

The other end of platen 12 has a number of small idler gears 30 which are supported by axles 32 on a second end plate 34. End plate 34 also includes notches 36 for supporting the end of circuit board 20. The other end of circuit board 20 is connected to motor bracket 61 thus being supported between the motor 14 and end plate 34.

End plate 34 includes an opening 38 through which cabling 40, 42 can extend. This cabling connects to the circuitry on circuit board 20.

In one embodiment, the platen is made to be lightweight, thus requiring less power and allowing a smaller motor to be inserted inside the platen. For example, the platen could be made lightweight by using plastic, acrylic, or other materials in an extrusion process to provide an extruded platen. One method and apparatus for providing an extruded platen is shown in co-pending application entitled "Low Inertia/Cost Extruded Platen," Ser. No. 08/806,895 filed on the same day herewith, the disclosure of which is hereby incorporated herein by reference.

In the embodiment shown in FIG. 1, a contact image sensor (CIS) 44 is mounted above the platen in between the tops of the two end plates. A holder or housing 46 for the CIS 44 is provided, with a spring(s) 48 between holder 46 and CIS 44 in order to bias the CIS up against the platen 12. This spring allows paper to be fed through, while maintaining appropriate pressure for holding the paper against the platen. Appropriate openings are provided in the holder 46 for cabling 50 which is connected to the image sensor array in CIS 44.

Many variations of the embodiment of FIG. 1 could be used while still providing a motor inside of a platen. For example, bearings or slip bushings could be used instead of idler gears 30. Bushings could be used rather than cabling for the electrical contacts, or wireless connections could be used with a battery-operated motor. The gearing system could be either a planetary gearing system of spur gears, or helical gears. Helical gears may provide a quieter operation and better strength for holding positioning.

Figure 2:
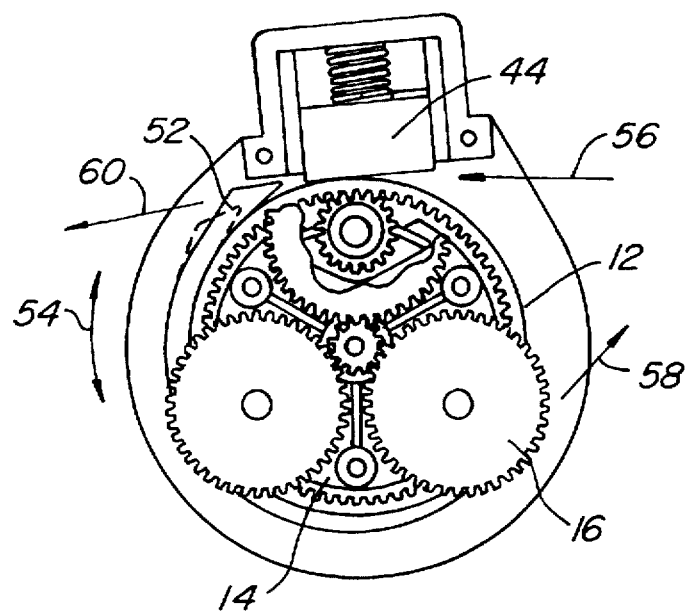
FIG. 2 is an end view of the platen of FIG. 1.

FIG. 2 is an end view of the scanner 10 of FIG. 1. FIG. 2 shows the platen 12 with the gears 16 and motor 14, and the CIS 44 mounted above the platen. Also shown is a deflector shield 52 which can move up or down in the directions indicated by arrows 54.

Paper can be inserted in the path indicated by arrow 56. If the deflector shield 52 is in the up position, the paper will be deflected, move around the platen and exit as indicated by arrow 58. If the deflector shield is downward, the paper exits without going around the platen as indicated by arrow 60. Such a configuration can allow a user to manually adjust the deflector shield for different types of operation. Due to the contact area between the deflector 52 and the relatively large diameter platen, the paper movement can continue after leaving the contact point between the CIS 44 and the platen 12. This allows the device to feed the document completely out of the device, or, would allow reversing the motor and re-scanning the document as it passes out the front feed slot. Preferably, the planetary gears provide single/double (or more) reduction as required by the particular design torque requirements. As pointed out above, the platen is preferably lightweight, with annular gears 18 either cut into an extruded platen, or designed into a molded platen, or inserted subsequently.

Figure 3:
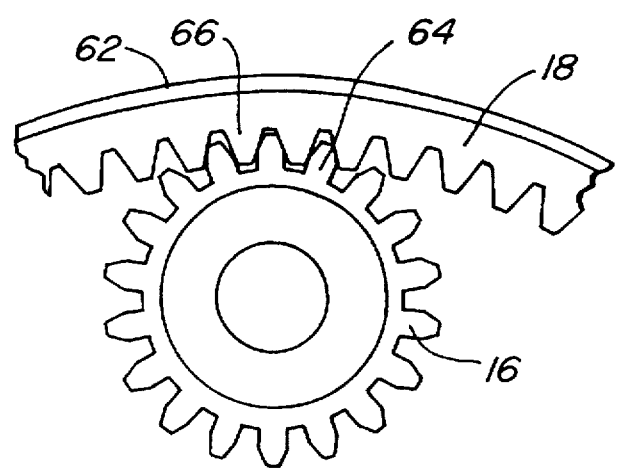
FIG. 3 is a partial end view of the platen in FIG. 2 showing the gears in more detail.

FIG. 3 is a more detailed view of the engagement of the gears on one of gears 16 with annular gear 18. Annular gear 18 is preferably a rigid support material, or is mounted on a rigid support material, with an outer portion 62 of the platen being either co-extruded or over-molded or otherwise attached to provide a less rigid, high friction surface for contact with the paper.

The engagement of the teeth 64 of idler gears 62, and teeth 66 of annular gear 18 may be designed using helical gears so that multiple teeth engage at a time, or can have only a single tooth engage. Variations can vary the amount of backlash in the gears. A little bit of backlash may provide for lower start-up torque requirements.

The present invention thus provides a compact, minimum form factor modular engine. It can be made at low cost using an extruded or molded platen. The paper path can be controlled under power without requiring additional rollers. In addition, a universal mounting is provided which can be used in different scanner housing designs or to accommodate different angles or other paper path variables. The design also provides a high reduction ratio of gears, thus translating to lower power consumption by the motor, allowing a smaller motor which is more easily inserted and powered.

Figure 4:
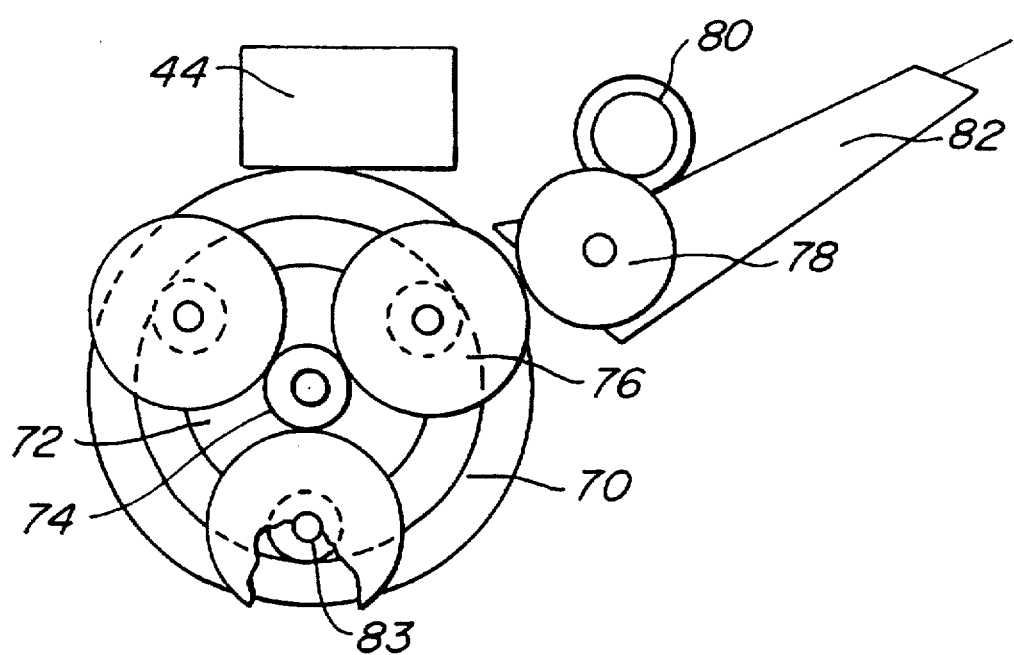
FIG. 4 is a more detailed view of the engagement of the gears of FIG. 2.

FIG. 4 shows an alternate embodiment in which a platen 70 is driven by an internal motor 72, with a central pinion gear 74 driving gears 76. Gears 76 provide double reduction 83 while also extending farther, contacting the additional gear 78 which drives a shaft 80 in an external sheet feeder 82. Thus, the internal motor could not only drive the platen, but could also drive the external sheet feeder for feeding papers across the platen.

In an alternate embodiment, other image sensors than a CIS sensor 44 could be used. For example, the CIS could be mounted internally to the platen to provide an even more compact design with a transparent platen being used. Such a design is set forth in commonly assigned co-pending patent application "Clear Platen With Internal Sensor", Ser. No. 08/806,895, filed even date herewith, the disclosure of which is incorporated herein by reference.

As will be understood by those skilled in the art, the present invention may be embodied in other specific forms without departing from the spirit or essential characteristics thereof. For example, for weight distribution purposes, it may be desirable to locate the motor centrally and use a long shaft to connect it to drive gears on both sides of the platen. Cabling could still enter the platen through the openings between the idler drive gears. Accordingly, the above embodiments are intended to be illustrative of the invention, but not limiting of the scope of the invention, which is set forth in the following claims.

What is claimed is:

1. An image scanner comprising:

a hollow platen;

a motor mounted inside said platen;

a drive mechanism coupled between said motor and said platen to rotate said platen in response to said motor;

a circuit board mounted inside said platen;

circuitry for controlling said motor mounted on said circuit board;

a first end plate coupled to said drive mechanism to support said drive mechanism and allow rotation of said platen relative to said first end plate;

a second end plate coupled to said circuit board to support said circuit board and allow rotation of said platen relative to said second end plate;

an opening in said second end plate; and an electrical connection to said motor extending through said opening.

2. The scanner of claim 1 further comprising:

an annular gear mounted on an inside surface of said platen.

3. The scanner of claim 2 further comprising:

a first annular gear mounted on an inside surface of a first end of said platen;

a second annular gear mounted on an inside surface of a second end of said platen;

said drive mechanism comprising a set of drive gears engaged with said first annular gear; and at least one undriven idler gear engaged with said second annular gear.

4. The scanner of claim 1 further comprising:

a paper deflector mounted adjacent, outside, and in contact with said platen.

5. The scanner of claim 4 wherein said paper deflector is adjustable to allow paper feed without deflection in one mode.

6. The scanner of claim 1 further comprising an image sensor mounted adjacent said platen.

* * * * *